United States Patent [19]

Starzewski et al.

[11] Patent Number: 4,691,036

[45] Date of Patent: Sep. 1, 1987

[54] ORGANIC NICKEL COMPOUNDS, THE PRODUCTION THEREOF AND THE USE THEREOF AS POLYMERIZATION CATALYSTS

[75] Inventors: Karl-Heinz A. O. Starzewski, Bad Vilbel; Josef Witte, Cologne; Herbert Bartl, Odenthal, all of Fed. Rep. of Germany

[73] Assignee: Bayer Aktiengesellschaft, Leverkusen, Fed. Rep. of Germany

[21] Appl. No.: 830,330

[22] Filed: Feb. 18, 1986

[30] Foreign Application Priority Data

Feb. 27, 1985 [DE] Fed. Rep. of Germany ....... 3506835

[51] Int. Cl.$^4$ .............................................. C07F 15/04
[52] U.S. Cl. ........................................ 556/16; 556/22; 526/89; 585/360
[58] Field of Search ..................................... 556/16, 22

[56] References Cited

U.S. PATENT DOCUMENTS

| | | | |
|---|---|---|---|
| 3,644,563 | 2/1972 | Bauer et al. | 556/16 X |
| 3,647,914 | 3/1972 | Glockner et al. | 556/16 X |
| 3,647,915 | 3/1972 | Bauer et al. | 556/16 X |
| 4,123,447 | 10/1978 | Fahey et al. | 556/16 |
| 4,529,554 | 7/1985 | Beach et al. | 556/22 X |
| 4,537,982 | 8/1985 | Starzewski et al. | 556/22 |

Primary Examiner—Helen M. S. Sneed

Attorney, Agent, or Firm—Connolly & Hutz

[57] ABSTRACT

Nickel compounds which can be produced by reacting a nickel(O) compound or a nickel compound, which can be converted in situ into a nickel(O) compound, with an adduct or a mixture of maleic acid anhydride and a tertiary phosphine, optionally with a compound of the formula (I)

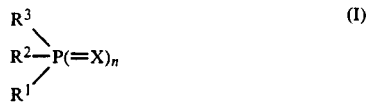

(I)

wherein
X represents O, NR$^4$ or

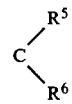

and
n represents zero or one, and optionally with an organoaluminium compound, are suitable for the homo-and copolymerization of 1-olefins and for the polymerization of acetylene.

9 Claims, No Drawings

ORGANIC NICKEL COMPOUNDS, THE PRODUCTION THEREOF AND THE USE THEREOF AS POLYMERIZATION CATALYSTS

The present invention relates to nickel compounds which can be produced by reacting a nickel(O) compound or a nickel compound, which can be converted in situ into a nickel(O) compound, with an adduct or a mixture of maleic acid anhydride and a tertiary phosphine, optionally with a compound of the formula (I)

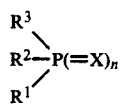
(I)

and optionally with an organoaluminium compound, as well as the production thereof and the use thereof as catalysts in the polymerisation and copolymerisation of 1-olefins and for the polymerisation of acetylene.

A process for the production of polyethylene waxes is known from German Offenlegungsschrift No. 2 923 206, which is characterised in that ethylene is polymerised in a solvent mixture of an aromatic hydrocarbon and a hydroxyl group-containing solvent at a temperature of from 50° to 100° C. and under a pressure of from 0.7 to 350 bar of excess pressure by means of a catalyst, consisting of (a) a zero valent nickel compound and (b) an adduct and/or a mixture of a quinoid compound and a tertiary phosphine.

A low molecular weight polyethylene is formed; the process is very restricted in its selection of solvents.

It has now been surprisingly found that these disadvantages can be overcome and specific polyolefin waxes and medium and high molecular weight polyolefin plastics materials can be produced if new nickel catalysts are used, which in place of The quinoid compound contain maleic acid anhydride (MAA) and optionally additionally the compound of the formula I and an organoaluminium compound.

The new catalysts are also suitable for the copolymerisation of ethene with other 1-olefins, for example propene, 1-butene, 1-hexene or 1-octene, whereby the copolymers contain up to 10 mol %, based on total monomers, of 1-olefins which are different from ethene.

The new catalysts are moreover suitable for the polymerisation of acetylene.

The present invention correspondingly provides nickel compounds which can be produced by reacting a nickel(O) compound or a nickel compound, which can be converted in situ into a nickel(O) compound, with an adduct or a mixture of MAA and a tertiary phosphine, optionally with a compound of the formula (I)

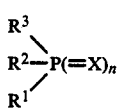
(I)

wherein $R^1$, $R^2$ and $R^3$ represent, independently from each other, optionally halogen-, hydroxy-, $C_1$-$C_{20}$-alkoxynitro- or $C_6$-$C_{12}$-aryloxy-substituted $C_1$-$C_{20}$-alkyl, $C_2$-$C_{20}$-alkenyl, $C_6$-$C_{12}$-aryl or $C_3$-$C_8$-cycloalkyl, moreover $C_6$-$C_{12}$-aryl-$C_1$-$C_{20}$-alkyl, $C_1$-$C_{20}$-alkyl-$C_6$-$C_{12}$-aryl, $C_6$-$C_{12}$-aryl-$C_2$-$C_{20}$-alkenyl, $C_1$-$C_{20}$alkyl-$C_3$-$C_8$-cycloalkyl and $C_6$-$C_{12}$-aryl-$C_3$-$C_8$-cycloalkyl, di-$C_1$-$C_4$-alkylamimo, optionally substituted phenoxy or alkoxy $R^4$, $R^5$ and $R^6$ represent hydrogen, silyl, halogen, cyano or $R^1$, X represents O, $NR^4$ or

and n represents zero or one, and optionally with an organoaluminium compound.

Suitable tertiary phosphines correspond to the formula (II)

(II)

wherein $R^7$, $R^8$ and $R^9$ represent, independently from each other, optionally halogen-, hydroxy-, $C_1$-$C_{20}$-alkoxy- or $C_6$-$C_{12}$-aryloxy-substituted $C_1$-$C_{20}$-alkyl, $C_6$-$C_{12}$-aryl, $C_2$-$C_{30}$-alkenyl or $C_3$-$C_8$-cycloalkyl, moreover, $C_6$-$C_{12}$-aryl-$C_1$-$C_{20}$-alkyl, $C_1$-$C_{20}$-alkyl-$C_6$-$C_{12}$-aryl, halogen, hydroxy, $C_1$-$C_{20}$-alkyoxy or $C_6$-$C_{12}$-aryloxy.

Preferred radicals $R^1$, $R^2$ and $R^3$ are $C_1$-$C_6$-alkyl, cyclohexyl, phenyl, tolyl, benzyl, di-$C_1$-$C_4$-alkylamino, phenoxy and methoxy.

Preferred radicals $R^4$, $R^5$ and $R^6$ are hydrogen, $C_1$-$C_6$-alkyl, phenyl, $C_1$-$C_4$-alkylphenyl, chlorophenyl, nitrophenyl, trimethylsilyl, chlorine and cyano.

$R^7$, $R^8$, $R^9$ are preferably cyclohexyl, phenyl, tolyl, benzyl, vinyl and $C_1$-$C_4$-alkyl.

Ni(cyclooctadiene)$_2$ and Ni(allyl)$_2$ are mentioned as examples of nickel(O) compounds.

The following are mentioned by way of example as nickel compounds which can be converted in situ into nickel(O) compounds: Ni-acetyl acetonate, Ni-octanoate and Ni-stearate, which can be reduced by means of conventional reducing agents such as boranate, alanate, aluminium alkyls or lithium organyls.

Suitable organoaluminium compounds are, for example, trialkyl- and trialkoxyaluminium compounds, in which the alkyl and alkoxy groups preferably have from 1 to 4 carbon atoms.

The nickel compounds according to the invention containing a compound of formula I correspond, according to the present findings, to the formula (III)

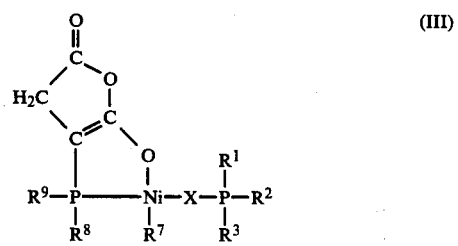
(III)

wherein $R^1$, $R^2$, $R^3$, $R^7$, $R^8$, $R^9$ and X are represented as given above.

From 1 to 4 mol of MAA and of the tertiary phosphine, and from 0 to 4 mol of the compound of formula (I) are preferably used in each case per mol of nickel(O) compound, particularly preferably 1 mol of MAA, as well as tertiary phosphine and 1 mol of the compound of formula (I) per mol of the nickel(O) compound.

The reaction temperature is from 0° to 100° C., particularly from 20° to 70° C.

The reaction is carried out under the exclusion of oxygen, preferably in a solvent which must be inert in relation to the reactants, such as benzene, toluene, cyclohexane and n-hexane.

On completion of the reaction, the catalyst is usually used directly, without isolation, for the polymerisation of 1-olefins. The reaction mixture can also be filtered, whereby the filtrate, which contains the catalyst, can be used for the polymerisation. The catalyst can also be isolated by concentrating the reaction mixture or by concentrating and/or cooling the filtrate.

It is also possible to produce the catalyst in the presence of the olefins to be polymerised.

The compounds according to the invention can be transported, and metered in easily, and are catalytically effective in a large number of solvents, and active in a wide temperature range and a wide pressure range.

The present invention further provides the use of the nickel compounds according to the invention as catalysts in the polymerisation and copolymerisation of 1-olefins, particularly of ethene, and in the polymerisation of acetylene.

The quantity of the nickel compound used is not critical. Typical catalyst concentrations are from $10^{-2}$ to $10^{-4}$ mol per liter. The quantity of catalyst, based on ethene, is in the range of from 0.005 to 10% by weight, preferably from 0.01 to 0.1% by weight.

The following methods are suitable for the polymerisation of olefins with the catalysts according to the invention:

(a) introduction of the solid, dissolved or suspended catalyst (or the components thereof), addition of the olefin, then heating (b) introduction of the olefin, injection of the catalyst solution or suspension (or the components thereof)

(c) continuous metering of the catalyst solution or suspension (or the components thereof) under predetermined desired polymerisation conditions (pressure, temperature) into the olefin.

The polymerisation can be carried out in a solvent or diluent or dispersing agent, whereby, for example, aliphatic compounds such as n-hexane, cyclohexane, aromatic substances such as benzene, toluene, xylene, chlorobenzene, ketones such as acetone, methyl ethyl ketone, esters such as ethyl acetate, acid amides such as dimethyl formamide and ethers such as tetrahydrofuran or mixtures of these solvents can be used.

The polymerisation can be carried out both continuously and discontinuously.

The polymerisation temperature is preferably from 20° to 200° C., particularly from 60° to 150° C. The olefin pressure to be used is at least 1 bar, preferably from 5 to 1000 bar.

EXAMPLES

General Procedure for the Ethene (Co)polymerisation

The catalyst according to the invention is injected (single pulse injection) as a solution or suspension in toluene into an autoclave which is oxygen-free and water-free and which contains solvent, whereby reaction solutions of the catalyst components ("in situ" catalysts) can be used. The comonomer is optionally added. The autoclave is brought to the desired temperature after compression of ethene. After a polymerisation time of from 1 to 4 hours, cooling is allowed to take place, the pressure of the autoclace is released and the polymer is isolated by filtration, in the case of soluble or liquid portions by removing the solvent in a rotary evaporator.

2 mmol of bis-cyclooctadiene nickel(O) (component I) in 50 ml of dry nitrogen-saturated toluene are mixed under nitrogen with 2 mmol of an adduct of triphenylphosphine and MAA (component II) and 2 mmol of component III. The mixture is heated for 30 minutes at 40° to 60° C. with intensive stirring, 2 mmol of component IV are then optionally added and stirring takes place for a further 30 minutes. The dark yellow-brown suspension is used in the subsequent polymerisation.

| Example. | components III and IV | monomer comonomer solvent | reaction temperature (°C.) reaction time (h) | yield (g) | melting point (°C.) | intrinsic viscosity in tetralin at 140° C. (dl/g) | density (g/cm³) | comonomer-proportion mol-% | % by weight |
|---|---|---|---|---|---|---|---|---|---|
| 1 | ethylidene triphenyl-phosphorane; | 100 bar ethene 1 l cyclohexane | 100 4 | s: 300 l: — | 129 | 0.48 | 0.976 | — | — |
| 2 | ethylidene triphenyl-phosphorane | 100 bar ethene 1 l toulene | 100 4 | s: 344 l: — | 129 | 0.34 | 0.977 | — | — |
| 3 | ethylidene triphenyl-phosphorane; aluminum tri-isopropylate | 100 bar ethene 1 l cyclohexane | 100 4 | s: 362 l: — | 128 | 0.61 | 0.976 | — | — |
| 4 | triphenyl phosphine; aluminum tri-isopropylate | 100 bar ethene 1 l cyclohexane | 100 4 | s: 63 l: 44 | 134 | 2.22 | 0.967 | — | — |
| 5 | ethylidene triphenyl phosphorane; aluminum tri- | 100 bar ethene 0.5 l propene 1 l cyclohexane | 100 4 | s: 380 l: — | 119 | 0.23 | 0.953 | 2.4 | 3.6 |

-continued

| Example. | components III and IV | monomer comonomer solvent | reaction temperature (°C.) reaction time (h) | yield (g) | melting point (°C.) | intrinsic viscosity in tetralin at 140° C. (dl/g) | density (g/cm³) | comonomer-proportion mol-% | % by weight |
|---|---|---|---|---|---|---|---|---|---|
| 6 | isopropylate ethylidene triphenyl- phosphorane | 100 bar ethene 0.5 l 1-octene 1 l cyclohexane | 100 4 | s: 420 l: — | 124 | 0.19 | 0.96 | 1.0 | 3.9 | s: polymer yield
l: oligomer yield

EXAMPLE 7

10 bar of ethene are polymerised in 12 l of cyclohexane at 100° C. for 1 hour with a catalyst of the components I and II and methylene triphenyl phosphorane (in each case 2 mmol) in 200 ml of toluene corresponding to the above procedure by "multi pulse injection". "Multi pulse injection" means that the catalyst is injected into the autoclave portionwise over the duration of the reaction.

A polymer yield of 47 g is obtained with a melting point of 127° C., an intrinsic viscosity in tetralin at 140° C. of 0.43 dl/g and a density of 0.969 g/cm³ and an oligomer yield (oil) of 45 g.

EXAMPLE 8

Ethene is polymerised with a catalyst, the component III of which is ethylidene triphenylphosphorane (2 mmol) and the component IV of which is aluminium triisopropylate (2 mmol), according to Example 7.

A polymer yield of 205 g is obtained with a melting point of 127° C., a intrinsic viscosity in tetralin at 140° C. of 0.33 dl/g and a density of 0.976 g/cm³ and an oligomer yield (oil) of 33 g.

We claim:

1. Nickel compounds produced by reacting a nickel(O) compound or a nickel compound which can be converted in situ into a nickel(O) compound with an adduct or a mixture of maleic acid anhydride and a tertiary phosphine.

2. Compounds according to claim 1 wherein the tertiary phosphine is of the formula

wherein $R^7$, $R^8$ and $R^9$ independent of each other represent halogen, hydroxy, or substituted or unsubstituted $C_1$–$C_{20}$-alkyl, $C_6$–$C_{12}$-aryl, $C_2$–$C_{30}$-alkenyl, $C_3$–$C_8$-cycloalkyl, $C_6$–$C_{12}$-aryl-$C_1$–$C_{20}$-alkyl, $C_1$–$C_{20}$-alkyl-$C_6$–$C_{12}$-aryl, $C_1$–$C_{20}$-alkyoxy or $C_6$–$C_{12}$-aryloxy, which when substituted are substituted by halogen, hydroxy, $C_1$–$C_{20}$-alkoxy or $C_6$–$C_{12}$-aryloxy.

3. Compounds according to claim 1 wherein the tertiary phosphine corresponds to the formula

wherein $R^7$, $R^8$, $R^9$ represent cyclohexyl, phenyl, tolyl, benzyl, vinyl and $C_1$–$C_4$-alkyl.

4. Compounds according to claim 1 formed from an additional reactant which is a compound of the formula

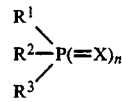

wherein
$R^1$, $R^2$ and $R^3$ independent of each other represent substituted or unsubstituted $C_1$–$C_{20}$-alkyl, $C_2$–$C_{20}$-alkenyl, $C_6$–$C_{12}$-aryl, $C_3$–$C_8$-cycloalkyl, $C_6$–$C_{12}$-aryl-$C_1$–$C_{20}$-alkyl, $C_1$–$C_{20}$-alkyl-$C_6$–$C_{12}$-aryl, $C_6$–$C_{12}$-aryl-$C_2$–$C_{20}$-alkenyl, $C_1$–$C_{20}$-alkyl-$C_3$–$C_8$-cycloalkyl and $C_6$–$C_{12}$-aryl-$C_3$–$C_8$-cycloalkyl, or di-$C_1$–$C_4$-alkylamino, which when substituted are substituted by halogen, hydroxy, $C_1$–$C_{20}$-alkoxy, $C_6$–$C_{12}$-aryloxy or nitro;
X is —O—, $NR^5$ or

n is zero or one, and
$R^4$, $R^5$ and $R^6$ are independent of each other hydrogen, silyl, halogen, cyano or one of the $R^1$ definitions.

5. Compounds according to claim 1 formed from an additional reactant which is an organoaluminum compound.

6. Compounds according to claim 5 wherein the organoaluminum compound is trialkyl aluminum or trialkoxy aluminum.

7. A process for the production of nickel compounds according to claim 9 wherein a nickel(O) compound or a compound which can be converted in situ into a nickel(O) compound, is reacted with an adduct or a mixture of maleic acid anhydride and a tertiary phosphine.

8. The process according to claim 7 wherein the tertiary phosphine is of the formula

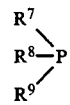

wherein $R^7$, $R^8$ and $R^9$ independent of each other represent halogen, hydroxy, or substituted or unsubstituted $C_1$–$C_{20}$-alkyl, $C_6$–$C_{12}$-aryl, $C_2$–$C_{30}$-alkenyl, $C_3$–$C_8$-cycloalkyl, $C_6$–$C_{12}$-aryl-$C_1$–$C_{20}$-alkyl, $C_1$–$C_{20}$-alkyl-$C_6$–$C_{12}$-aryl, $C_1$–$C_{20}$-alkyoxy or $C_6$–$C_{12}$-aryloxy, which when substituted are substituted by halogen, hydroxy, $C_1$–$C_{20}$-alkoxy or $C_6$–$C_{12}$-aryloxy.

9. The process according to claim 7 wherein the reaction is carried out at 0° to 100° C. in an inert solvent with the exchange of oxygen.

* * * * *